(12) United States Patent
Jacobsen et al.

(10) Patent No.: US 8,558,489 B2
(45) Date of Patent: Oct. 15, 2013

(54) MICRO MOTOR

(75) Inventors: Stephen C. Jacobsen, Salt Lake City, UT (US); Shane Olsen, Farmington, UT (US); Marc X. Olivier, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 342 days.

(21) Appl. No.: 12/959,159

(22) Filed: Dec. 2, 2010

(65) Prior Publication Data

US 2012/0139466 A1 Jun. 7, 2012

(51) Int. Cl.
 *H02P 6/00* (2006.01)
(52) U.S. Cl.
 USPC ........... 318/400.01; 318/400.37; 310/40 R
(58) Field of Classification Search
 USPC ........... 318/400.01, 400.38, 400.37; 310/42, 310/66, 71, 81, 40 A
 See application file for complete search history.

(56) References Cited

U.S. PATENT DOCUMENTS

| | | | |
|---|---|---|---|
| 1,409,703 A | 3/1922 | Gilman | |
| 1,703,842 A | 2/1929 | Gartin | |
| 3,191,081 A | 6/1965 | Faulhaber | |
| 4,164,690 A | 8/1979 | Muller et al. | |
| 4,361,776 A * | 11/1982 | Hayashi et al. | 310/268 |
| 4,503,346 A | 3/1985 | Bertram et al. | |
| 4,794,284 A | 12/1988 | Buon | |
| 4,881,002 A | 11/1989 | Yamaguchi | |
| 4,883,996 A | 11/1989 | Aoki | |
| 4,899,072 A * | 2/1990 | Ohta | 310/49.46 |
| 5,216,310 A | 6/1993 | Taghezout | |
| 5,229,677 A | 7/1993 | Dade et al. | |
| 5,412,265 A | 5/1995 | Sickafus | |
| 5,412,267 A | 5/1995 | Okada et al. | |
| 5,685,062 A | 11/1997 | McCarthy et al. | |
| 5,701,047 A | 12/1997 | Johnson | |
| 5,767,606 A | 6/1998 | Bresolin | |
| 5,972,029 A | 10/1999 | Fuisz | |
| 6,031,305 A | 2/2000 | Satoh et al. | |
| 6,054,786 A | 4/2000 | Springer | |
| 6,066,909 A | 5/2000 | Springer et al. | |
| 6,157,112 A | 12/2000 | Suzuki et al. | |
| 6,169,354 B1 | 1/2001 | Springer et al. | |
| 6,204,588 B1 | 3/2001 | Springer | |
| 6,320,288 B1 * | 11/2001 | Suzuki et al. | 310/68 B |
| 6,369,475 B1 | 4/2002 | Yang | |
| 6,437,466 B1 | 8/2002 | Taghezout | |
| 6,713,914 B2 * | 3/2004 | Yoshida et al. | 310/89 |
| 6,717,313 B1 | 4/2004 | Bae | |
| 6,982,530 B2 * | 1/2006 | Takeuchi | 318/34 |
| 7,170,214 B2 | 1/2007 | Henderson et al. | |
| 7,188,401 B2 * | 3/2007 | Shimomura et al. | 29/521 |

(Continued)

*Primary Examiner* — Rina Duda
(74) *Attorney, Agent, or Firm* — Thorpe North & Western LLP

(57) ABSTRACT

A thinly configured and brushless miniature DC micro motor that includes at least two substantially-flat motor cells that are aligned axially. Each motor cell comprises a stator coil having an elongate opening and passage for a rotor shaft, and a cross-polarized rotor magnet carried on the rotor shaft and received within the elongate opening. The micro motor also includes a frame substrate that fixably supports the stator coils of the motor cells while providing a bearing means for rotatably supporting the rotor shaft, so that selectively energizing one of the motor cells creates an electric current in the stator coil interacting with a magnetic field of the received rotor magnet to generate a torque between the rotor shaft and the frame substrate.

8 Claims, 6 Drawing Sheets

(56) References Cited

U.S. PATENT DOCUMENTS

| | | |
|---|---|---|
| 2002/0153790 A1 | 10/2002 | Kanebako et al. |
| 2002/0166240 A1 | 11/2002 | Duford et al. |
| 2003/0010550 A1 | 1/2003 | Prucher |
| 2003/0048021 A1 | 3/2003 | Frazee |
| 2003/0168926 A1 | 9/2003 | Zepp et al. |
| 2003/0227231 A1 | 12/2003 | Ostovic |
| 2004/0063536 A1 | 4/2004 | Atarashi |
| 2004/0202777 A1 | 10/2004 | Nishikawa et al. |
| 2004/0202797 A1 | 10/2004 | Ginder et al. |
| 2004/0247438 A1 | 12/2004 | McCoin |
| 2005/0082837 A1 | 4/2005 | Alstot et al. |
| 2005/0116575 A1 | 6/2005 | Zepp et al. |
| 2005/0120856 A1 | 6/2005 | Duford et al. |
| 2006/0038456 A1 | 2/2006 | Bojiuc |
| 2006/0038460 A1 | 2/2006 | Bojiuc |
| 2006/0131978 A1 | 6/2006 | Hirzel et al. |

\* cited by examiner

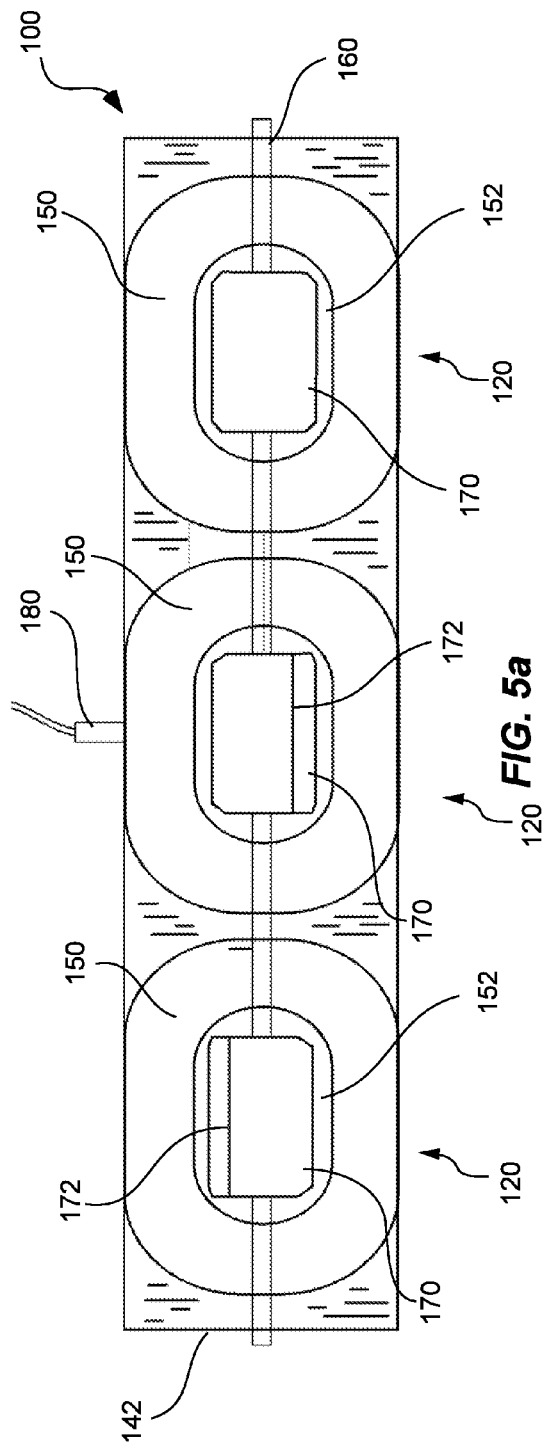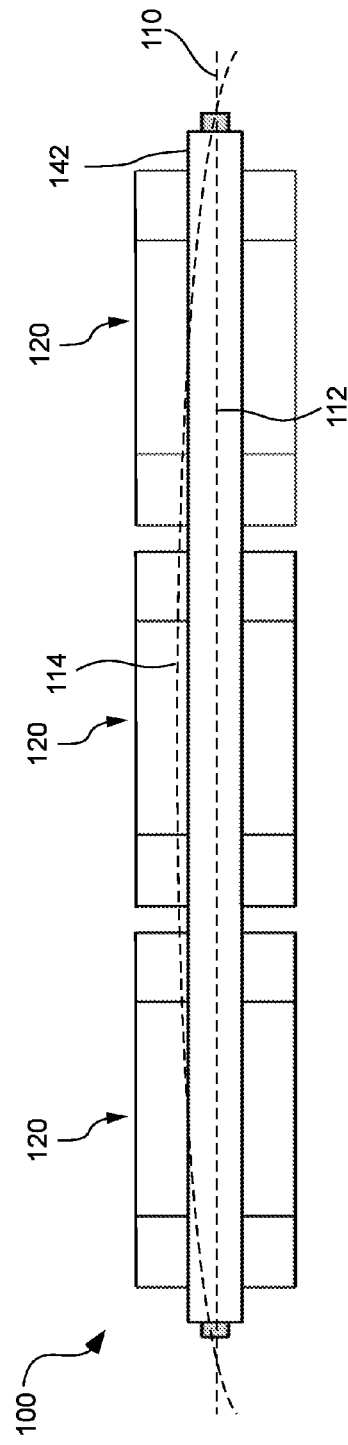

MICRO MOTOR

FIELD OF THE INVENTION

The field of the invention relates generally to DC motors, and more specifically to brushless DC motors having rotors formed with permanent magnets.

BACKGROUND OF THE INVENTION AND RELATED ART

In response to developments and innovations in many technological fields such as computing, consumer electronics, medical devices and robotics, etc., demand has increased for miniature motors that can power small mechanical and/or electromechanical devices. Examples include computer cooling fans and disc drives, medical micro-pumps, miniature laboratories, remote control vehicles, and mobile sensing devices, etc. In some applications it is also desirable that the motor have a substantially-flat shape factor to better fit within or conform to restricted space requirements.

In the prior art, brushless direct current (DC) motors have often been used where there are space or shape limitations, as these motors can be constructed in several different physical configurations that are readily adaptable for small sizing. In a configuration known as the 'inrunner' DC motor, permanent magnets are mounted on a spinning rotor surrounded by stationary stator windings. Another common variation is the 'outrunner' DC motor, in which the rotor's permanent magnets are mounted on an overhanging disc which surrounds the interior stator windings. Popular applications for disc-shaped outrunner motors include the cooling fans and disc drives found in personal computers.

The shape factors of both the inrunner and outrunner designs dictates that their drive shaft extend out-of-the-plane to the motor disc and perpendicular to the stator coils. In certain applications, however, it may be desirable to have a miniature and substantially-flat powering device having a drive shaft which lies parallel with, and not perpendicular, to the plane of the stator coils. It may also be desirable to have a powering device that can readily be scaled to meet the various power requirements of the driven devices.

SUMMARY OF THE INVENTION

In accordance with a representative embodiment described herein, a thinly-configured and brushless DC micro motor is provided having at least two substantially-flat motor cells that are aligned axially or end-to-end. Each motor cell comprises a stator coil having an elongate opening and passage for a rotor shaft, and a cross-polarized rotor magnet carried on the rotor shaft and received within the elongate opening. The motor further includes a frame substrate that fixably supports the stator coils of the motor cells while providing a bearing means for rotatably supporting the rotor shaft, so that selectively energizing one of the motor cells creates an electric current in the stator coil interacting with a magnetic field of the received rotor magnet to generate a torque between the rotor shaft and the frame substrate.

In accordance with another representative embodiment broadly described herein, a thinly-configured and brushless miniature DC motor is provided having a rotatable shaft, at least two cross-polarized rotor magnets distributed axially along the length of the rotatable shaft, and at least two stator coils having elongate openings for receiving the rotor magnets therein, such that each stator coil and received rotor magnet forms a motor cell. Selectively energizing one of the at least two motor cells creates an electric current in the stator coil interacting with a magnetic field of the rotor magnet received therein to create a torque between the rotatable shaft and the stator coil.

In accordance with yet another representative embodiment, a method of using a thinly-configured and brushless DC micro motor is provided that includes the steps of obtaining a micro motor having at least two substantially-flat motor cells aligned end-to-end, with each motor cell comprising a stator coil supported on a frame substrate having an elongate opening and passage for a rotor shaft therein, and a cross-polarized rotor magnet carried on the rotor shaft and received within the elongate opening. The method further includes sensing a pole position of a rotor magnet relative to the frame substrate, energizing at least one of the motor cells to create an electric current in the stator coil interacting with a magnetic field of the received rotor magnet and generate a torque between the rotor shaft and the frame substrate, and controlling the direction and speed, or dynamic rotation, of the micro motor by alternately driving pulses of electric current of reversed polarity through the stator coils in response to the sensed pole position.

In accordance with yet another embodiment, a method of using a thinly-configured brushless DC micro motor is provided that includes the steps of obtaining a micro motor having at least two substantially-flat motor cells aligned end-to-end, where each motor cell comprises a stator coil supported on a frame substrate which has an elongate opening and passage for a rotor shaft therein, and a cross-polarized rotor magnet carried on the rotor shaft and received within the elongate opening. The method further includes energizing at least one of the motor cells to create an electric current in the stator coil interacting with a magnetic field of the received rotor magnet and generate a torque between the rotor shaft and the frame substrate, and controlling the angular position of the rotatable shaft by selectively driving an electric current of fixed polarity through at least one of the stator coils in accordance with a pre-determined combination of energization states.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments of the present invention and are not, therefore, to be considered limiting of its scope. And furthermore, it will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings, in which:

FIG. 3 illustrates a cross-sectional view of the embodiment of FIG. 1 taken along section line A-A of FIG. 2a;

FIGS. 5a and 5b together illustrate the top and side views of a miniature DC micro motor, in accordance with another representative embodiment;

DETAILED DESCRIPTION OF EXEMPLARY EMBODIMENTS

Figure 1:
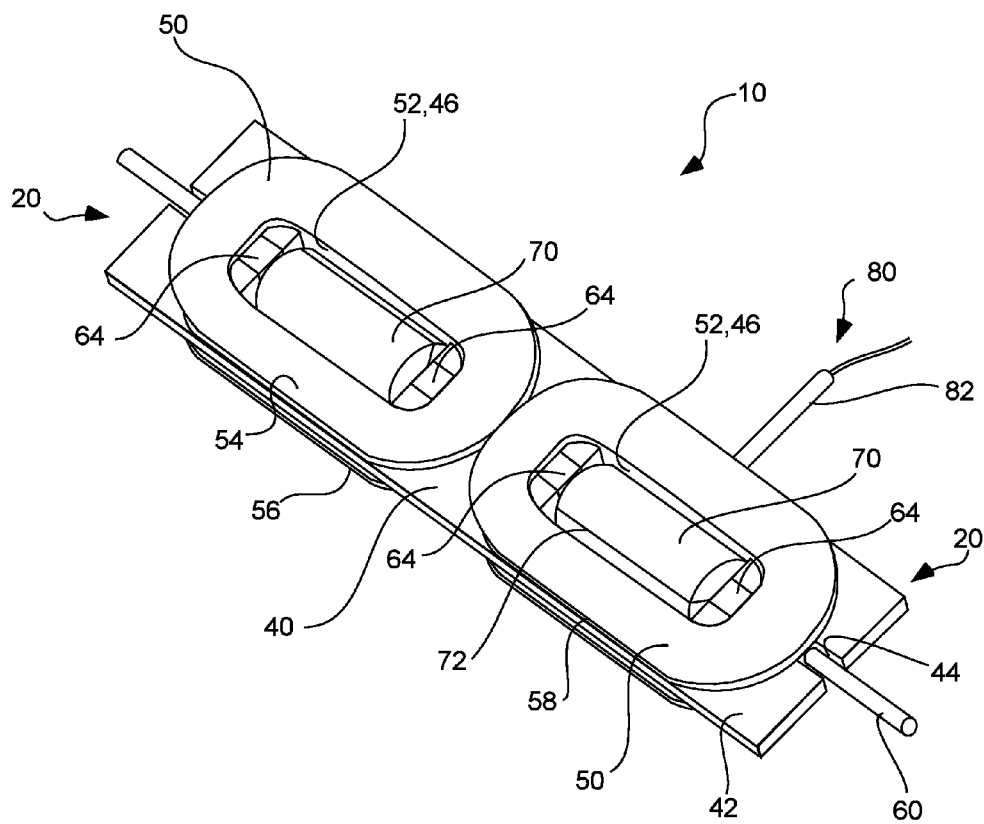
FIG. 1 is a perspective view of a miniature DC micro motor, in accordance with one representative embodiment.
Figure 2A:
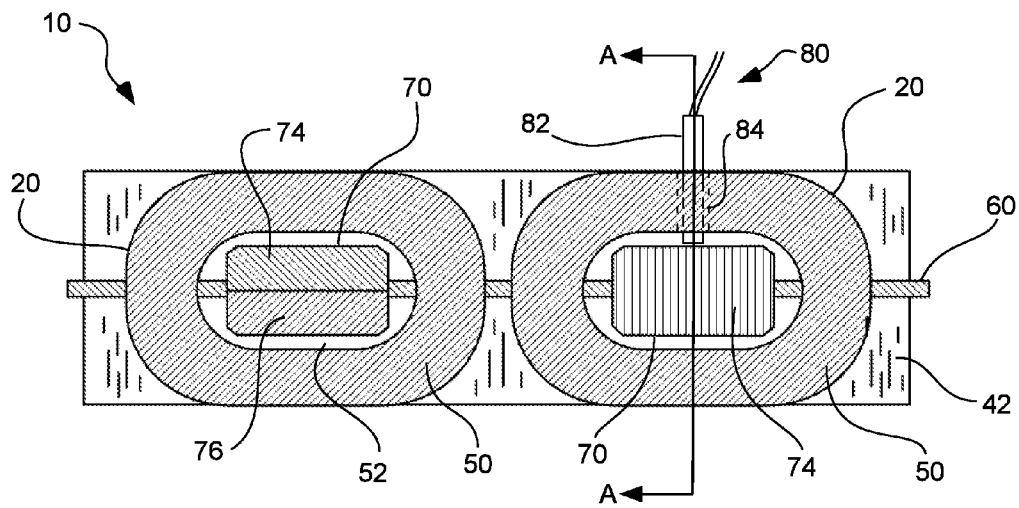
FIGS. 2a-2c together illustrate the top, side and end views of the embodiment of FIG. 1.
Figure 2B:
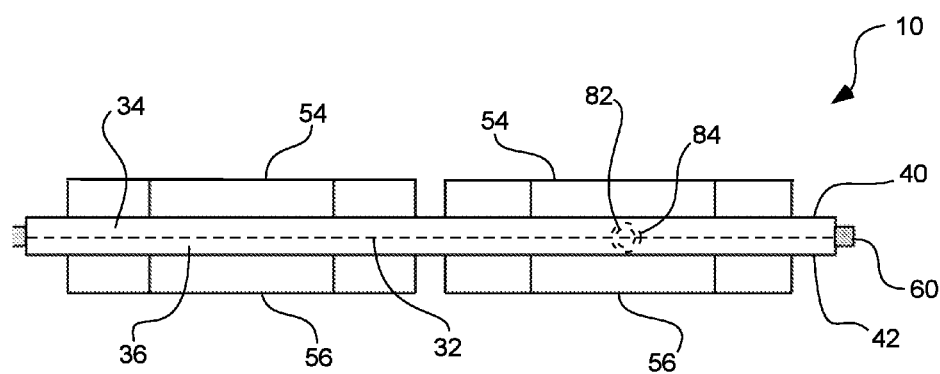
Figure 2C:
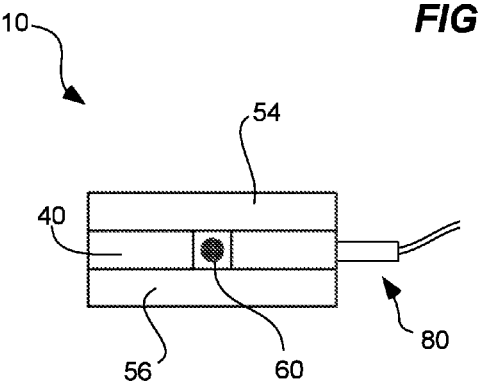

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative embodiments of the invention will best be understood with reference to the accompanying drawings, wherein the elements and features of the embodiments are designated by numerals throughout.

In describing and claiming the present invention, the following terminology will be used.

The singular forms "a," "an," and "the" include plural references unless the context clearly dictates otherwise. Thus, for example, reference to "the stator coil" includes reference to one or more of such structures, "a permanent magnetic material" includes reference to one or more of such materials, and "energizing at least one motor cell" refers to one or more of such steps, etc.

As used herein, "stator coil" refers to a substantially-flat coil of wound electrical conductors that is configured to form a single electrical circuit. The stator coil can be one body of wound conductors, or two or more bodies of wound conductors separated by thin substrates but which are electrically connected to form, when energized, a single electromagnet with magnetic flux lines passing perpendicular through the center of the coil.

As used herein, "cross-polarized rotor magnet" refers to a two-pole permanent rotor magnet having a direction of magnetization that is substantially perpendicular to the plane of the magnetization split line, and in which the spin-axis of the rotor magnet also falls within the plane of the magnetization split line.

As used herein, "substantial", when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided by the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, and sub-ranges such as 10 to 50, 20 to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Illustrated in FIGS. 1-8 are several exemplary embodiments of a thinly-configured and brushless miniature DC motor, or micro motor, which embodiments also include various methods of using the thinly-configured micro motor. As described herein, the micro motor provides several significant advantages and benefits over other electric motor devices. However, the recited advantages are not meant to be limiting in any way, as one skilled in the art will appreciate that other advantages may also be realized upon practicing the present invention.

The micro motor can have a substantially-flat configuration with a rotatable rotor shaft that is orientated parallel to, rather than perpendicular to, the plane of the stator coils. For instance, in one exemplary embodiment the micro motor can have a thickness of about 1 millimeter and a length of about 5 to 10 millimeters. In another aspect the rotatable shaft of the micro motor can be comprised of a thin wire, such as piano wire, and each of the rotatable shaft and rotor magnets, the non-rotating stator coils and frame substrate can be flexible so that the micro motor can be operated in a flexed or curved position. In other aspects the miniature DC micro motor can be configured with appropriate bearings for continuous rotation at very high speeds, up to and including about 100,000 rpm, or may be controlled to a plurality of static, or non-rotating, discrete angular positions.

The micro motor can be comprised of a plurality of individual motor cells, each motor cell including a single stator coil and a cross-polarized permanent magnet, and including any necessary supporting bearings and structure and electronic circuitry, etc. The motor cells can be distributed axially along the length of the rotor shaft. Although at least two motor cells are required to provide starting torque and directional control, the rotatable shaft can be lengthened and the number of motor cells increased, resulting in a scalable micro motor that can provide additional torque, increased operational flexibility and a more uniform power output for any given size of the rotatable shaft, rotor magnets, and stator coils.

Given its potentially small size, substantially-flat shape factor and wide range of operating capabilities, the micro motor can offer numerous advantages over small or flat motors described in the prior art, some of which are recited here and throughout the following more detailed description. For instance, the micro motor's small size allows it to be coupled, either directly or indirectly, to a wide variety of miniature driven devices. The micro motor's flat shape factor, with the rotatable shaft parallel to the plane of the stator coils, can also allow for the micro motor and its driven device to be mounted on a flat strip, band, belt, ribbon or computer-chip substrate, etc. This can provide system designers with greater flexibility, well as options for improved power, control and performance, in developing electrically-powered micro devices.

Illustrated in FIGS. 1 and 2a-2c are a perspective view and the top, side and end views of a miniature DC micro motor 10 having two motor cells 20 mounted end-to-end on a frame 40. Each motor cell can comprise a stator coil 50 having an elongate opening 52 formed in the center that is configured to receive a rotor magnet 70. The motor cell can further comprise the rotor magnet that is carried on a rotatable shaft 60 and received within the elongate opening. The rotatable shaft may be constructed from a thin wire or similar flexible material. The rotor magnets may be constructed of permanent magnetic material.

Referring now to FIG. 1, the frame 40 of the micro motor 10 can be comprised of a substantially-flat or planar substrate 42 having a central slot, groove or passage 44 for receiving the rotatable shaft 60, and two elongate openings 46 corresponding in size, dimensions and location with the elongate openings 52 in the stator coils 50. In one aspect each stator coil 50 can further include an upper winding section 54 coupled to the top surface of the substrate 42 and a lower winding section 56 coupled to the bottom surface of the substrate 42. Each upper and lower winding section can have an elongate opening 52 that aligns with an elongate opening 46 in the substrate to form an overall elongate opening which receives a rotor magnet 70.

As may be appreciated, both the upper and lower winding sections 54, 56 can be comprised of one or more coils of fine conducting wire or similar conductors that are wound around the elongate opening into the shape of the upper or lower winding sections, forming an electro-magnetic winding capable of generating a magnet field when an electric current is passed through the conducting wires. Although mechanically separated by the substrate 42, the upper and lower winding sections 54, 56 can be electrically wired or coupled together to form a single stator coil 50 and which, when energized, can operate together as one electromagnet.

Each stator coil can be individually energized by a pulse generator or similar powering device (not shown) that can provide a pulse of current having a pre-determined profile (e.g. amplitude and polarity as a function of time). The current pulses to each coil can be initiated based upon the angular position of the rotor magnet with respect to the stator coil, as measured by an angular position device such as a Hall effect probe. The current pulses can be triggered to maximize the electromagnetic torque applied to the rotating shaft of the micro motor while minimizing the power dissipation in the coils. Thus, as can be appreciated by one of skill in the art, each motor cell of the micro motor can be individually electronically commutated.

The polarity or direction of the electric current through the conducting wires in the stator coil, furthermore, can be reversed to flip the orientation or direction of the electromagnetic torque produced by the motor cell. This can allow each stator coil to have three states: positive, negative and inactive. The strength of the electromagnetic torque generated in either the positive or negative states can be controlled by increasing or decreasing the amplitude of the electric current passing through the stator coils.

The micro motor 10 can further include a rotor comprising a rotatable shaft 60 supporting two or more rotor magnets 70. The rotatable shaft 60 can be positioned in a central slot 44 and supported by bearings 64 positioned at both ends of the elongate opening 52 in each stator coil 50. In one aspect the central slot can bisect the planar substrate 42, splitting the substrate into two halves that are coupled together via the bearings or bearing housings. In another aspect the central slot may extend only partially through the thickness of substrate to form a notch or groove into which the rotatable shaft 60 can be inserted.

The rotatable shaft 60 can include two or more cylindrical, cross-polarized permanent rotor magnets 70 having longitudinal center axes that are co-axial with the spin axis of the rotatable shaft. The spin axis of the cylindrical magnets/rotatable shaft may also be intersected by a N-S magnetization split line 72 that separates the north and south magnetic pole portions 74, 76 of each magnet (see FIG. 3) and creates a direction of magnetization that is substantially perpendicular to the plane of the magnetization split line 72.

The rotor magnets 70 can be distributed along the axial length of the rotatable shaft 60 and aligned within the elongate openings 52, 46 of the two or more stator coils 50, which can also be distributed axially along the length of the substrate 42. Locating the rotatable shaft 60 within the central slot 44 and rotor magnets 70 within the elongate openings 52, 46 of each stator coil 50 results in the micro motor 10 having two or more axially-distributed motor cells 20.

In one aspect the substrate 42 can be one solid body. In an alternative aspect depicted in FIG. 2b, the thickness of the substrate 42 may be great enough for the frame 40 to be split along a horizontal split line 32 into an upper half 34 and a lower half 36, with the lower half supporting the lower winding sections 56 and the upper half supporting the upper winding sections 54. Known as a split-frame configuration, during assembly the rotatable shaft 60 and rotor magnets (optionally with pre-assembled bearings) can positioned in the lower half of the frame 36, followed by lowering the upper half 34 onto the lower half to enclose the rotor. The upper and lower windings can then be electrically connected to form their respective stator coils and complete the micro motor.

Figure 3:
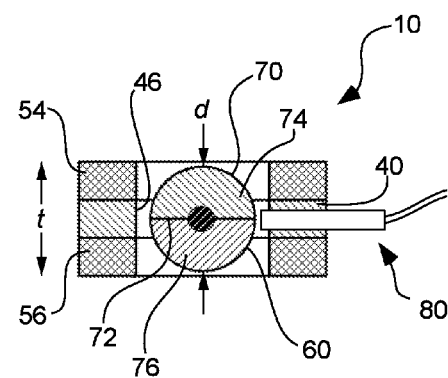

With reference to FIG. 3, the magnetization split line 72 (or direction of magnetization) in the rotor magnets 70 can be orientated with angular alignments different or separate from each other. The angular separation allows the micro motor 10 to self-generate a starting torque regardless of the angular orientation of the rotatable shaft 60 and rotor magnets 70. The angular separation also allows for controlling the rotational direction of the micro motor. In one aspect of the micro motor, the angular separation $\theta$ between the direction of magnetization of the at least two rotor magnets 70 can be derived in accordance with the formula $$\theta = \frac{180°}{\text{\# of rotor magnets}}.$$

Accordingly, the angular separation θ between the magnetization split lines 72 (or between the two directions of magnetization) in the two-motor cell micro motor 10 of FIG. 2 is 180°/2=90°, while the angular separation in a three motor cell micro motor (see FIGS. 5*a*-5*b*) is 180°/3=60°.

Figure 4A:
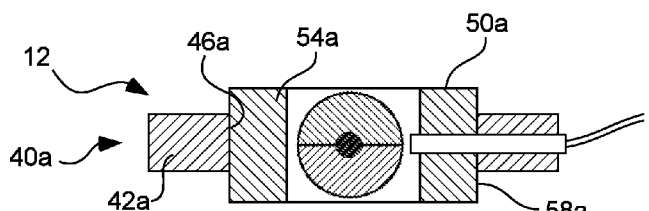
FIG. 4a is a cross-sectional view along section line A-A, in accordance with another representative embodiment.
Figure 4B:
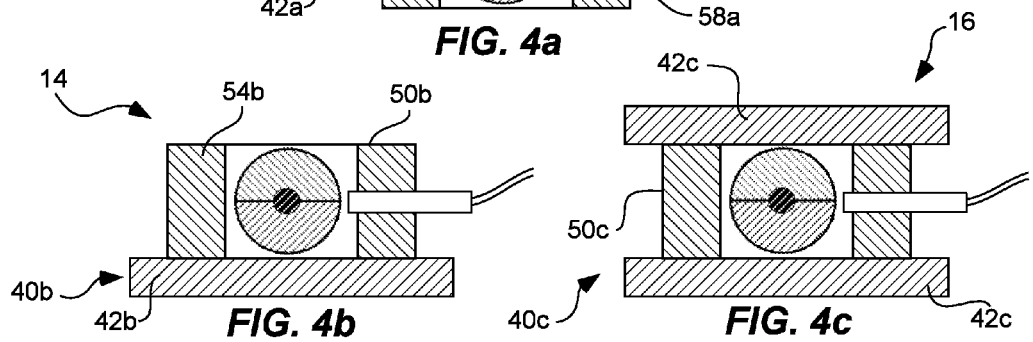
FIG. 4b is a cross-sectional view along section line A-A, in accordance with yet another representative embodiment.
Figure 4C:
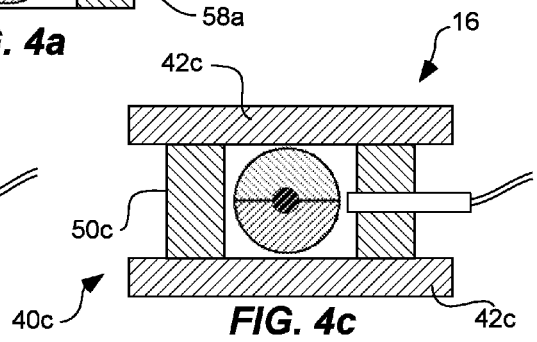
FIG. 4c is a cross-sectional view along section line A-A, in accordance with yet another representative embodiment.
Figure 6:
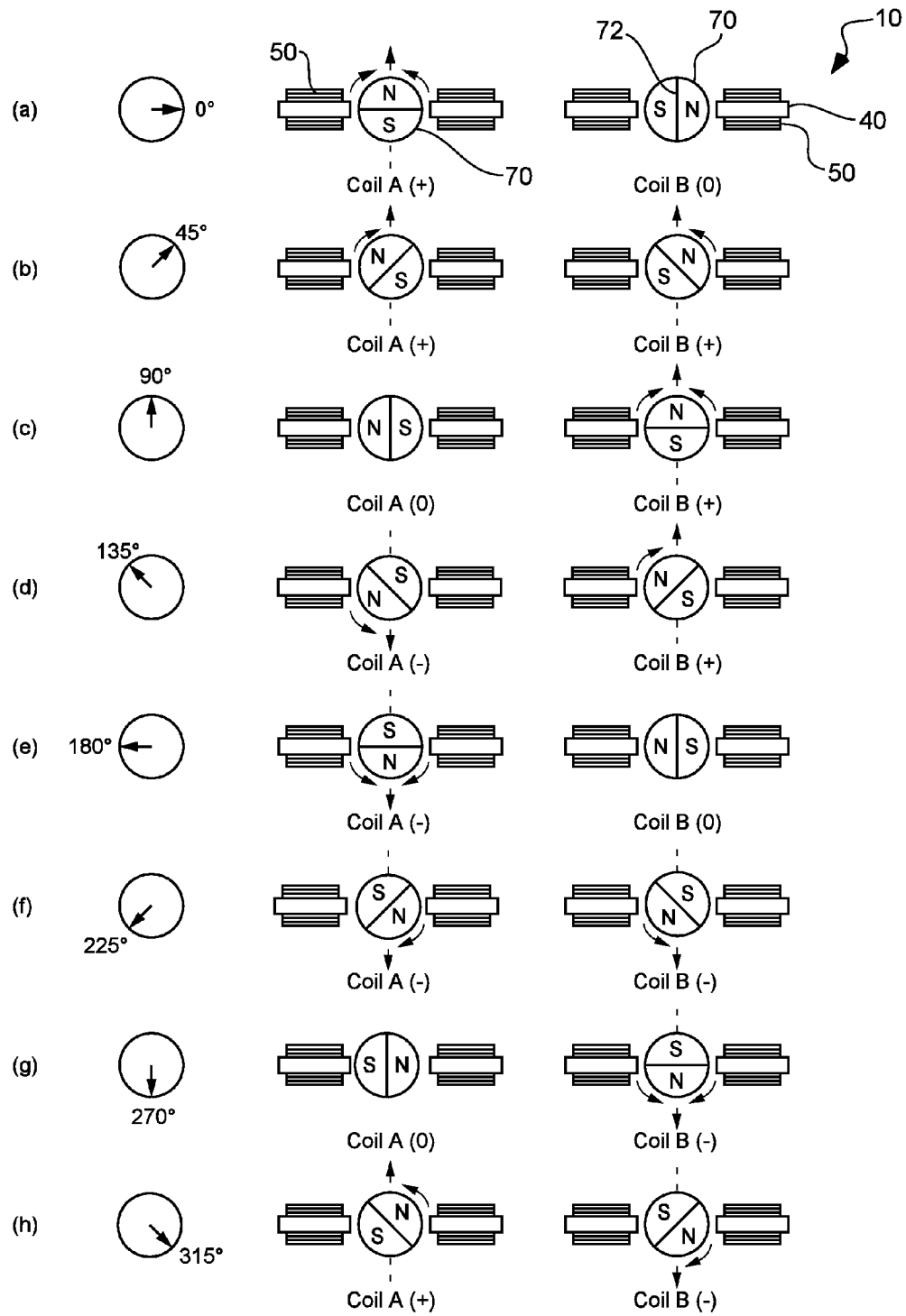
FIG. 6 is a schematic diagram illustrating eight static rotor positions which can be achieved with a micro motor having two motor cells configured in accordance with the embodiment of FIG. 1.

The frame and the two or more stator coils of the micro motor can be configured in a variety of relationships. For example, in the embodiment 12 illustrated in FIG. 4*a*, the interior diameter of the elongate opening 46*a* in the flat substrate 42*a* can be expanded to correspond in size, dimension and location with the outside diameter 58*a* of the single winding section 54*a*, forming a stator coil 50*a* that can be mounted within the frame 40*a*. Alternatively, in FIG. 4*b* the frame 40*b* of the micro motor 14 can comprise a planar substrate 42*b* coupled to either the top or bottom face of a single winding section 54*b* forming the stator coil 50*b* to create an open-face configuration. In FIG. 4*c*, the frame 40*c* of the micro motor 16 can comprise two planar substrates 42*c* coupled to both the top or bottom faces of the stator coil 50*c* to create a sandwich configuration.

Referring back to FIG. 1, the bearings 64 can be mounted to the substrate 42 within the stator coils themselves, to provide the structural support needed to suspend the rotatable shaft and rotor magnets within the motor cells. For instance, the rotatable shaft 60 can be supported with bearings 64 that straddle the central slot 46 in the planar substrate 42. However, it is to be appreciated that other arrangements for supporting the rotatable shaft and rotor magnets within the stator coils are also possible, including the split-frame, open-face, or sandwich configurations described above. Furthermore, while the bearings 64 are depicted in FIG. 1 as being located within the elongate openings 52, with two bearings for each motor cell 20, in other aspects of the micro motor the bearings can be located outside the stator coils 50, such as with end bearings at both outside ends of the frame and a single mid-span bearing positioned between the motor cells.

In one aspect the bearings 64 can be fluid film bearings or bushings that allow the rotatable shaft to turn on a thin film of lubricating oil or grease. Additionally, the internal surfaces of the bearings or the outer surfaces of the rotatable shaft can also be treated or coated with Teflon or a similar low friction material to provide a reduced-friction and low wear bearing interface between the rotating and non-rotating components.

As can be seen in FIGS. 1-3, the micro motor 10 can further include an angular position and/or speed detection system 80, such as a Hall effect probe 82. The detection system 80 can measure the position of the rotor's magnetization split line 72 relative to the stator coils, and in one aspect can be used to provide electronic commutation for the micro motor. The Hall effect sensor 82 can measure the magnetic field produced by the rotor magnet to give the position of the magnetic poles in relation to the flat stator.

The detection system 80 can be installed inside a passage or hole 84 in the substrate 42 that separates the upper winding section 54 from the lower winding section 56, so as to not disturb the electrical symmetry of the stator coil 50 while maintaining the substantially-flat shape factor. It can be appreciated that different types of angular position and speed detection systems can also be used, such as mechanical or optical encoders, proximity probes, etc., and that the sensor (s) for an angular position and/or speed detection system 80 can be placed at other locations and orientations relative to the frame 40. It can also be appreciated that one or more angular position and/or speed detection systems 80 can be used with each motor cell, providing the micro motor with multiple position/speed measurements.

As shown in FIG. 3, the overall thickness t of the micro motor 10, comprising the thickness of the upper and lower winding sections 54, 56 and the thickness of the planar substrate 42, can be substantially equal to the outside diameter d of the cross-polarized rotor magnets 70. Placing the motor cells 20 end-to-end and aligned in the same plane, as shown in FIG. 1, can result in the micro motor having a substantially-flat shape factor leading to a very thin configuration. Moreover, the flat shape factor and simple components can lend themselves to micro motors having a very small size. For example, in one embodiment the rotatable shaft 60 of the micro motor 10 can be made from a fused silicon fiber, a precision drawn wire, a piano wire or their equivalents. In yet another embodiment, the substantially-flat micro motor 10 can have a thickness t equal to or less than about one millimeter.

The micro motor's small size allows it to be coupled to a wide variety a miniature driven devices, such as fans, blowers or micro-pumps, to form small and complex assemblies such as miniature process systems. The micro motor can also be coupled to miniature gears, linkages, power trains or drive wheels to provide movement for miniature vehicles, robotic manipulators, etc. The device's flat shape factor, with the rotatable shaft parallel to the plane of the stator coils, can be further advantageous over the small or flat miniature motors disclosed in the prior art. For example, the flat shape factor can allow for the micro motor and its driven device to be mounted on a flat strip, band, belt, ribbon or computer-chip substrate, etc. Such a micro motor-based assembly can provide greater flexibility, as well as customizable power, control and performance, when designing micro-processing or micro-medical devices, such as chip-based laboratories and drug dispensing devices, or locomotion systems for remote control toys and vehicles and miniature robotic devices.

As can be seen in another representative embodiment 100 of the micro motor illustrated in FIGS. 5*a* and 5*b*, the micro motor can be scalable to comprise three or more motor cells 120 aligned axially (e.g. end-to-end), with each motor cell having a stator coil 150 with an elongate opening 152 into which is placed a cross-polarized rotor magnet 170. Adding additional motor cells to the micro motor can result in increased torque and power output for any given size of stator coils and rotor magnets. Adding additional motor cells also includes a greater number of rotor magnets, each of which are separated by smaller angular differences, which can have the effect of smoothing out the pulses of torque applied to the rotatable shaft by the motor cells.

The rotor magnets can be distributed axially along on the length of the rotatable shaft 160, with their magnetization split lines 172 (or directions of magnetization) having an angular separation that has been derived in accordance with the formula disclosed above. In the case of the embodiment 100 shown, the angular separation can be 180°/3=60°. Furthermore, the micro motor 100 can also include one or more detection systems 180 to measure the angular position of the rotor's magnetization split line relative to the stator coils, allowing for the determination of the rotor's angular position and rotational speed and direction.

Similar to the embodiments described above, the stator coils 150 of the illustrated embodiment 100 can be supported on a planar substrate 142 that divides the stator coils into electrically-connected upper and lower windings. However, the stator coils can also be single windings mounted to one side of the planar substrate, with the rotor shaft being carried by bearings mounted on supports extending outward from the substrate, etc. The stator coils can also be mounted or suspended within enlarged openings formed in the support frame. As can be appreciated, various other configurations for supporting a rotor shaft having cross-polarized rotor magnets within multiple stator coils to form a plurality of motor cells aligned end-to-end can be contemplated by one of skill in the art, and still fall within the scope of the present invention.

Further shown in FIG. 5b, the flat shape factor of the micro motor 100 can allow for the device to be more flexible or bendable about a lateral axis (e.g. extending into/out-of the page) than about its vertical axes. This can allow the micro motor to be configured for operation with a longitudinal axis or centerline 110 in a flexed condition 114 as well as in a normal, un-flexed or level condition 112. Moreover, the flat shape factor can also allow for continuous operation in a posture that is torqued or twisted about its longitudinal axis 110. As a result, the micro motor to be operated in a number of postures that would otherwise be unsuitable for the miniature motors described in the prior art. For instance, the micro motor and its driven device can be mounted on a flexible substrate, such as a strip of tape, which can then be adhered to the body of a human or animal and which can continue to function as the body moves through a range of motions and positions.

Additional advantages of the micro motor include its various modes for operation. As stated above, for example, the stator coil in each motor cell can be electrically coupled to its own, individually operable pulse generator having the capability to control both the voltage and direction of the current flowing through the stator windings, selecting between inactive, positive and negative states of energization. When the individual motor cells are sequentially energized in the proper order, the micro motor can be operated at high rates of speed, up to about 100,000 rpm. Alternatively, if one or more individual motor cells are instead continuously energized with a constant current, the micro motor can also be controlled to one of a plurality of static, or non-rotating, discrete angular positions.

FIGS. 6(a)-6(h) provide a schematic diagram illustrating the angular rotor positions which can be achieved with a two-motor cell micro motor (configured in accordance with the embodiment of FIG. 1) being operated in static mode. With the two-motor cell arrangement, the motor can be controlled to eight static and discrete angular positions that are separated by 45°. This can be accomplished by continuously energizing one or the other or both of the stator coils with a constant current and in accordance with a pre-determined combination of energization states, as described below. However, a nearly-infinite number of positions is also possible by micro-stepping motor cells (e.g. energizing the motor cells in various combinations and with different current levels), which shall be considered to fall within the scope of the present invention.

Shown in FIG. 6(a), the two stator coils 50 can be visualized in cross-sectional views as Coil A and Coil B. The two cross-polarized, permanent rotor magnets 70 are also shown, with their magnetization split lines 72 (and directions of magnetization) having an angular separation of 90°. Using the end of the rotor shaft as an arbitrary reference point, Coil A can be energized into its positive state while leaving Coil B in an inactive state. The magnetic field generated by Coil A will then move the N/S poles of the Coil A's rotor magnet into a straight up-and-down alignment, with the N pole on top, and align the reference point at 0 degrees. This will also place the N/S poles of Coil B's rotor magnet in a side-to-side alignment.

If Coil B is then energized into a positive state, while also maintaining Coil A in its original positively-energized state, the upwardly-directed magnetic fields in both coils will generate opposing torque loads on the rotor magnets which, if being equal, will rotate the rotor shaft approximately 45° until equilibrium is reached, as seen in FIG. 6(b). If Coil A is subsequently de-energized into an inactive state and Coil B is maintained in a positively-energized state, an upwardly-directed magnetic field is then applied only to Coil B's rotor magnet, causing the micro motor's rotor shaft to further rotate 45° to the 90 degree position, as seen FIG. 6(c).

Illustrated in FIG. 6(d) are the angular positions of the rotor shaft and magnets for a negatively energized Coil A and a positively energized Coil B. Similar to FIG. 6(b), the rotor shaft can reach a state of equilibrium at the 135 degree position when the downwardly-directed magnetic field generated by Coil A is counterbalanced by the upwardly-directed magnetic field generated by Coil B. FIGS. 6(e)-6(f) further illustrate the static angular positions that can be achieved by the micro motor by continuously energizing one or the other or both of the stator coils with a downwardly-directed, negatively energized state.

It can be appreciated that off-setting the direction of magnetization (or magnetization split lines 72) of the two cross-polarized rotor magnets by 90° results in a micro motor configuration in which each combination of energized states of the two motor cells results in a unique and absolute angular position of the rotor shaft. Regardless of the initial angular position of the micro motor, the rotor shaft can be moved to a unique angular position based on the energization states of the two motor cells. Consequently, an angular position and/or speed detection system is not required to operate the micro motor in a static intermittently-rotating mode, and the micro motor can be controlled to a variety of pre-determined static positions in accordance with a pre-determined combination of energization states of the pulse generators.

In such an finely-balanced state of equilibrium, the exact angular position of the rotor can be affected by the minor variations in the voltage applied to the stator windings, as well as the size, shape and density, etc., of the stator windings themselves, either of which can affect the strength of the generated magnetic fields. In one aspect of the micro motor, the minute variations in the stator coils can be mapped during an initial calibration process, in which the angular position of the rotor shaft can be monitored while varying the current to one or the other stator coils and measuring the resulting angular position of the rotor shaft. It is to be appreciated that a finely-calibrated two-motor cell micro motor may thus be statically controlled to angular positions between the 45° angular increments illustrated in FIGS. 6(a)-6(h).

Figure 7:
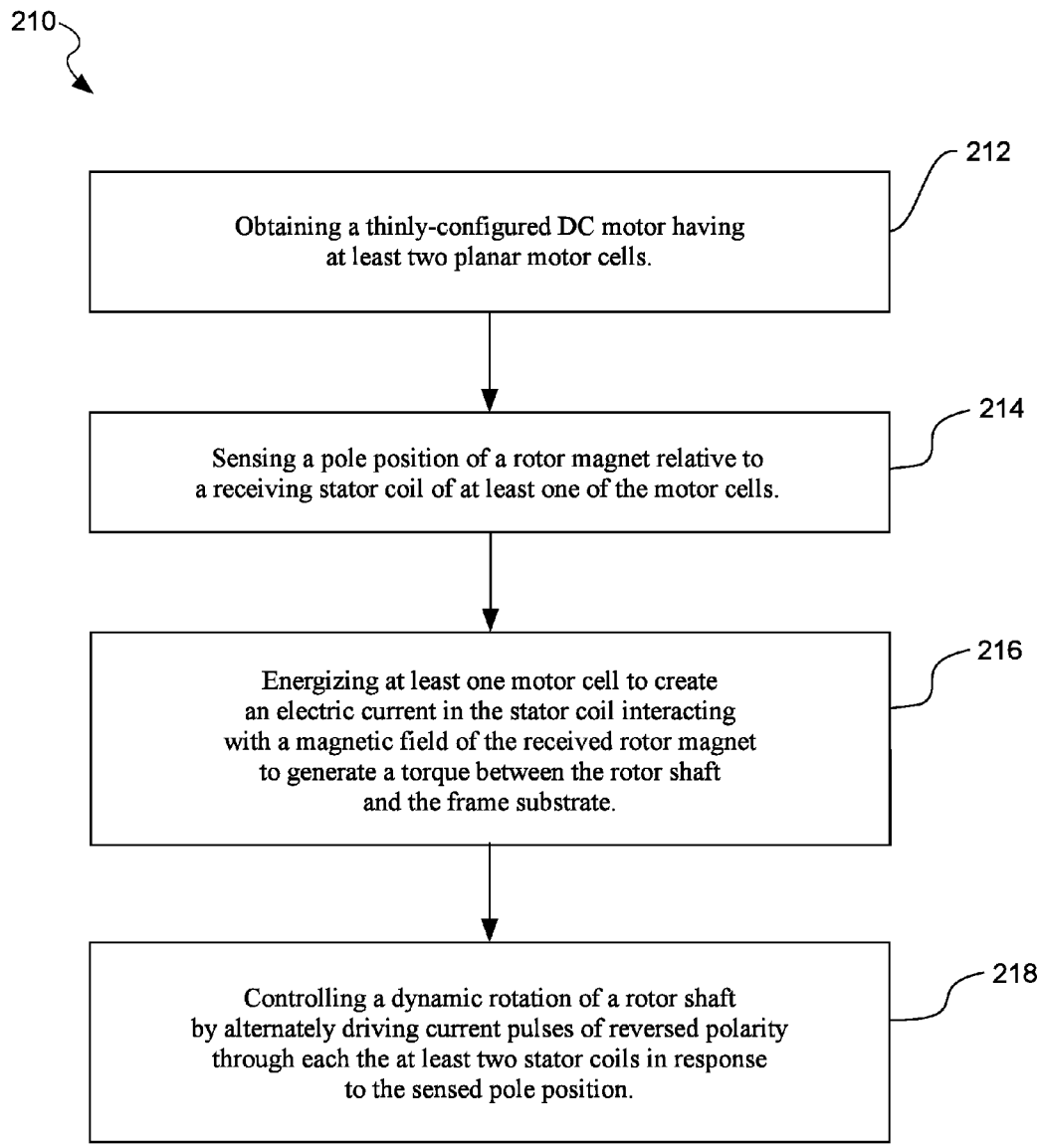
FIG. 7 is a flowchart depicting a method of using a thinly-configured DC micro motor, in accordance with one representative embodiment.

As described and illustrated hereinabove, the micro motor offers a high degree of flexibility in both its methods of operation as well as its physical shape factor. For instance, illustrated in FIG. 7 is a flowchart depicting a method 210 of operating a thinly-configured DC micro motor in a dynamic, continuously rotating mode, in accordance with one exemplary embodiment. The method includes obtaining 212 a thinly-configured DC motor having at least two substantially-flattened motor cells aligned end-to-end, with each motor cell comprising a stator coil supported on a frame substrate and having an elongate opening and passage for a rotor shaft therein, and a cross-polarized rotor magnet carried on the rotor shaft and received within the elongate opening. The method also includes sensing 214 a pole position of a rotor magnet relative to the frame substrate. The method further includes energizing 216 at least one of the motor cells to create an electric current in the stator coil interacting with a magnetic field of the received rotor magnet to generate a torque between the rotor shaft and the frame substrate, and controlling 216 the dynamic rotation (e.g. direction and speed) of the DC motor by alternately driving current pulses of reversed polarity through each of the at least two stator coils in response to the sensed pole position.

Figure 8:
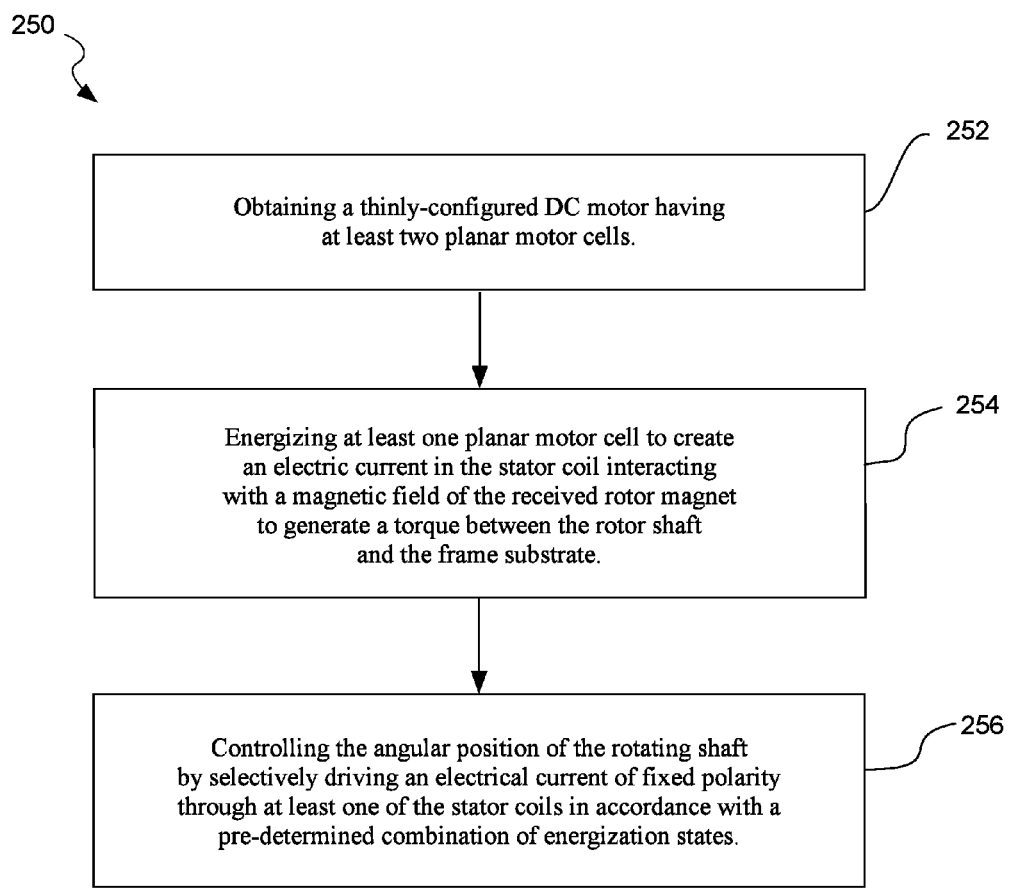
FIG. 8 is a flowchart depicting a method of using of thinly-configured DC micro motor, in accordance with another representative embodiment.

Illustrated in FIG. 8 is a flowchart depicting a method 250 of operating a thinly-configured DC micro motor in a static, intermittently rotating mode, in accordance with another exemplary embodiment. The method includes obtaining 252 a thinly-configured DC motor having at least two substantially-flattened motor cells aligned end-to-end, with each motor cell comprising a stator coil supported on a frame substrate and having an elongate opening and passage for a rotor shaft therein, and a cross-polarized rotor magnet carried on the rotor shaft and received within the elongate opening. The method further includes energizing 254 at least one of the motor cells to create an electric current in the stator coil interacting with a magnetic field of the received rotor magnet to generate a torque between the rotor shaft and the frame substrate, and controlling 256 the angular position of the rotor shaft by selectively driving an electric current of fixed polarity through at least one of the stator coils in accordance with a pre-determined combination of energization states.

Although the method 250 of operating the thinly-configured DC micro motor in a static, intermittently rotating mode can be accomplished without the use of an angular speed or position sensor, the controllability of this method of operation can be enhanced by including the steps of sensing a pole position of a rotor magnet relative to the frame substrate, and controlling the direction and speed or the angular position of the rotor shaft in response to the sensed pole position.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function limitation are expressly recited in the description herein. Accordingly, the scope of the invention should be determined solely by the appended claims and their legal equivalents, rather than by the descriptions and examples given above.

What is claimed and desired to be secured by Letters Patent is:

1. A thinly-configured brushless DC motor comprising:
   at least two motor cells aligned end-to-end, each motor cell comprising:
      a substantially-flat stator coil having an elongate opening and passage for a rotor shaft therein; and
      a cross-polarized rotor magnet carried on the rotor shaft and received within the elongate opening of the stator coil; and
   a frame substrate fixably supporting the stator coils of the at least two motor cells and having bearing means for rotatably supporting the rotor shaft,
   wherein selectively energizing at least one motor cell creates an electric current in the stator coil interacting with a magnetic field of the received rotor magnet to generate a torque between the rotor shaft and the frame substrate.

2. The DC motor of claim 1, further comprising three motor cells aligned end-to-end.

3. The DC motor of claim 1, wherein a thickness of the stator coils is substantially equal to an outside diameter of the rotor magnets to form a DC motor having a substantially-flat configuration.

4. The DC motor of claim 1, wherein a direction of magnetization of each of the at least two rotor magnets has an angular alignment different from a direction of magnetization of the other rotor magnet.

5. The DC motor of claim 1, further comprising at least one sensor configured between a rotor magnet and a stator coil to measure an angular position of the rotor magnet relative to the stator coil.

6. The DC motor of claim 1, further comprising a pulse generator operably coupled to each of the at least two stator coils for driving an electric current of alternating polarity through the stator coil.

7. The DC motor of claim 1, further comprising a powering device operable with the stator coils that facilitates control of an angular position of the rotor shaft by selectively driving an electric current of fixed polarity through at least one of the stator coils in accordance with a pre-determined combination of energization states.

8. A method of using a thinly-configured brushless DC motor comprising:
   obtaining a thinly-configured DC motor having at least two substantially-flat motor cells aligned end-to-end, each motor cell comprising:
      a stator coil supported on a frame substrate and having an elongate opening and passage for a rotor shaft therein; and
      a cross-polarized rotor magnet carried on the rotor shaft and received within the elongate opening; and
   sensing a pole position of a rotor magnet relative to the frame substrate;
   energizing at least one motor cell to create an electric current in the stator coil interacting with a magnetic field of the received rotor magnet to generate a torque between the rotor shaft and the frame substrate; and
   controlling a dynamic rotation of the rotor shaft by alternately driving pulses of electric current of reversed polarity through the stator coils in response to the sensed pole position.

* * * * *